(No Model.) 4 Sheets—Sheet 1.

S. V. HUBER.

FEED TABLE FOR ROLLING MILLS.

No. 11,646. Reissued Jan. 4, 1898.

WITNESSES:

Chas. F. Miller.

Marshall A. Christy

INVENTOR,

Sigmund V. Huber by Dennis S. Wolcott

Att'y.

(No Model.)

4 Sheets—Sheet 2.

S. V. HUBER.

FEED TABLE FOR ROLLING MILLS.

No. 11,646. Reissued Jan. 4, 1898.

WITNESSES:

Chas. F. Miller

Marshall A. Christy

INVENTOR,

Sigmund V. Huber by Darwin S. Wolcott

Att'y.

(No Model.)
4 Sheets—Sheet 3.
S. V. HUBER.
FEED TABLE FOR ROLLING MILLS.
No. 11,646. Reissued Jan. 4, 18 8.
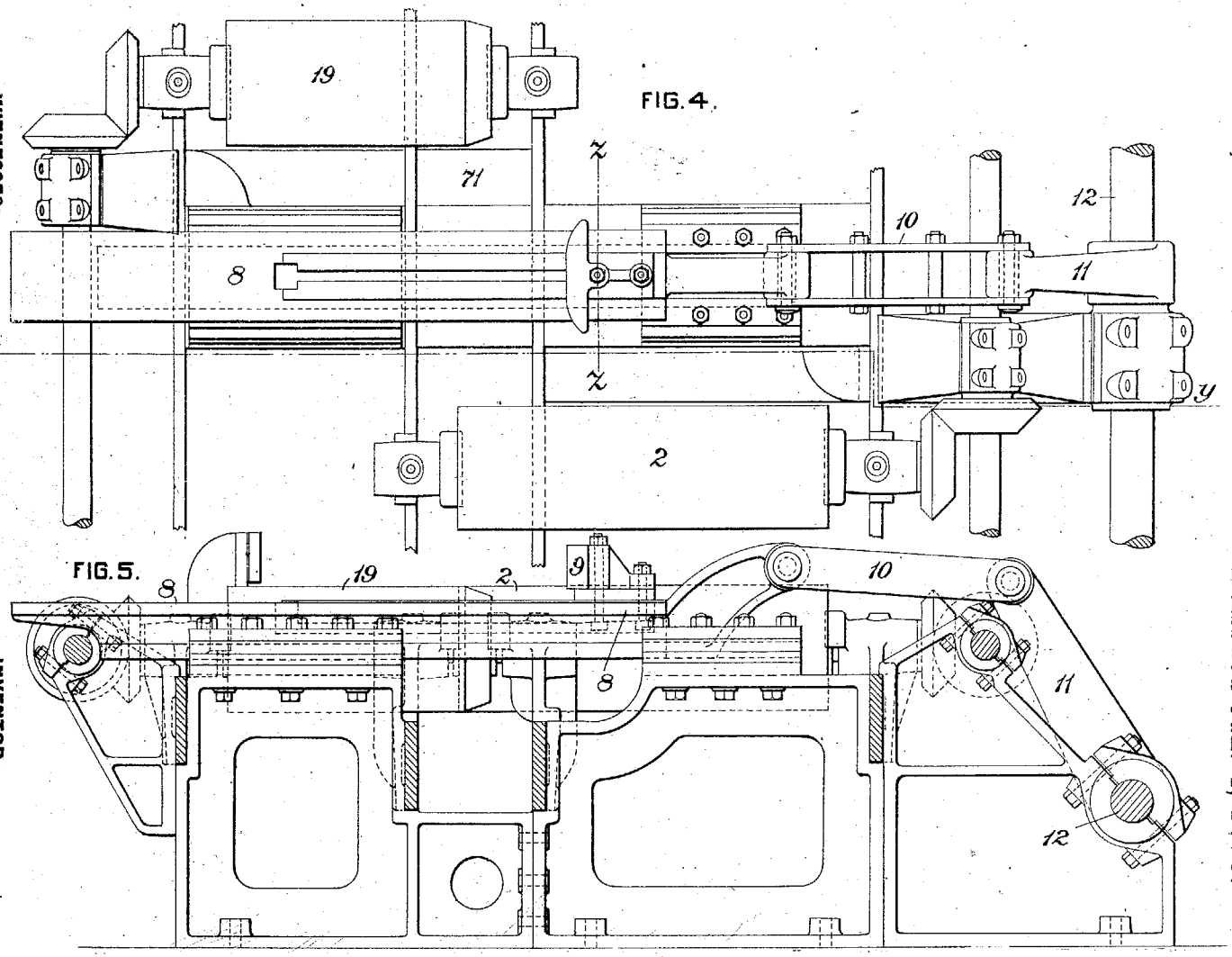
WITNESSES:
Chas. F. Miller.
Marshall A. Christy
INVENTOR,
Sigmund V. Huber
by Dennis S. Wolcott
Att'y.

(No Model.) 4 Sheets—Sheet 4.
S. V. HUBER.
FEED TABLE FOR ROLLING MILLS.
No. 11,646. Reissued Jan. 4, 1898.
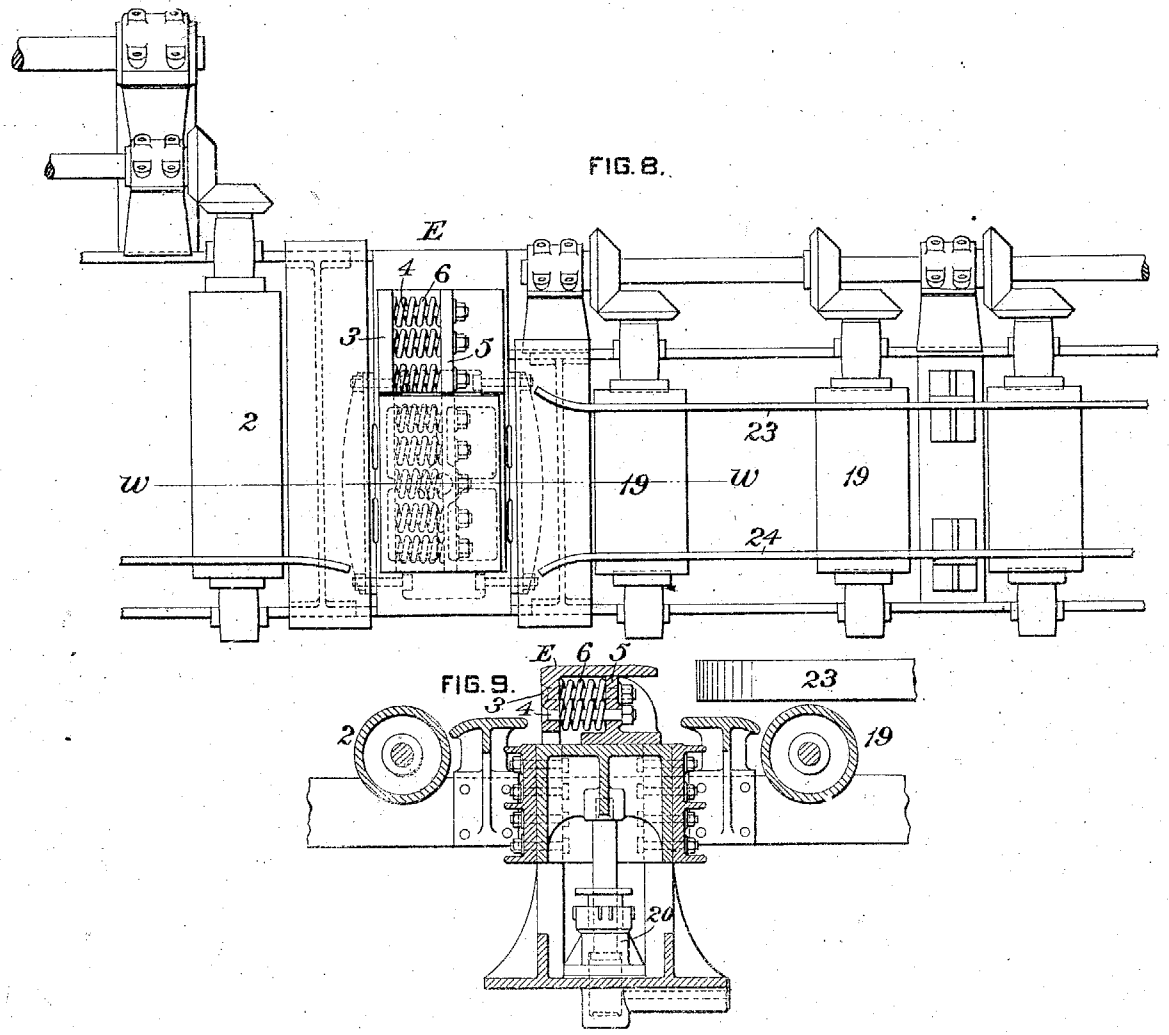
WITNESSES:
Chas. F. Miller.
Marshall A. Christy
INVENTOR,
Sigmund V. Huber
by Damon S. Wolcott
Att'

UNITED STATES PATENT OFFICE.

SIGMUND V. HUBER, OF YOUNGSTOWN, OHIO.

FEED-TABLE FOR ROLLING-MILLS.

SPECIFICATION forming part of Reissued Letters Patent No. 11,646, dated January 4, 1898.

Original No. 568,254, dated September 22, 1896. Application for reissue filed August 6, 1897. Serial No. 647,370.

*To all whom it may concern:*

Be it known that I, SIGMUND V. HUBER, a citizen of the United States, formerly of Pittsburg, Pennsylvania, but now residing at Youngstown, in the county of Mahoning and State of Ohio, have invented or discovered certain new and useful Improvements in Feed-Tables for Rolling-Mills, of which improvements the following is a specification.

The invention described herein relates to certain improvements in feed mechanism for the transfer of articles, such as billet-stock, from the reducing-rolls to the shearing mechanism, where such stock is cut up into billets; and the invention has for its object an arrangement of feed-tables and transfer mechanism whereby provision is made for the storage of the billet-stock while the shear mechanism is in operation, thereby rendering it possible to operate the reducing-rolls and shear mechanism continuously without regard to each other.

In general terms, the invention consists in the construction and combination, substantially as hereinafter particularly described and claimed.

Figure 1:
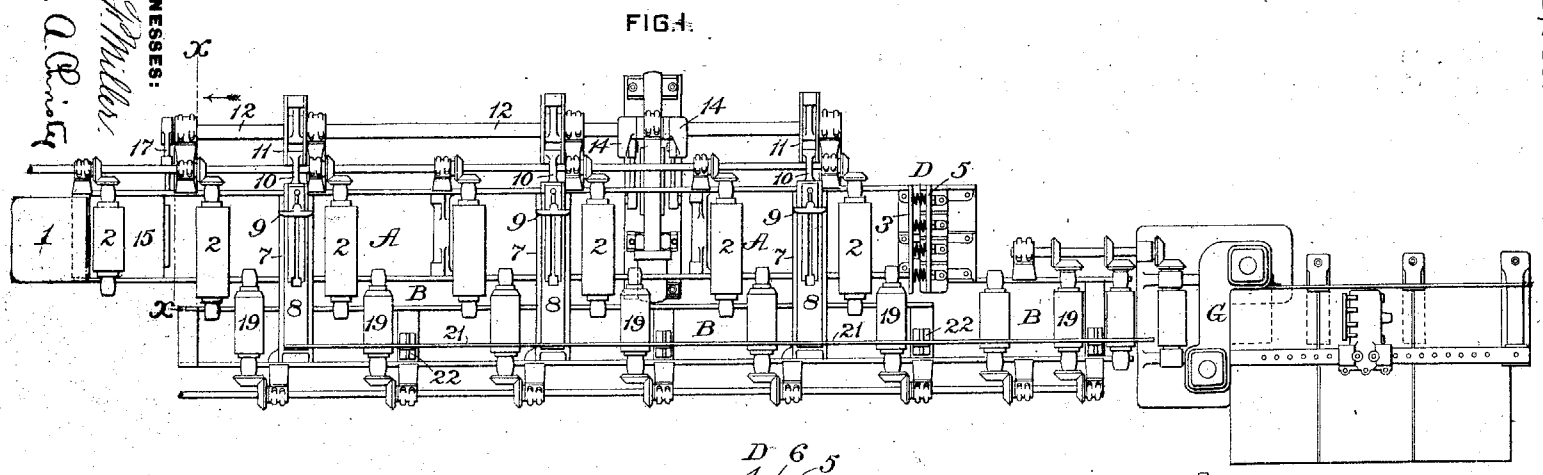
Figure 7:
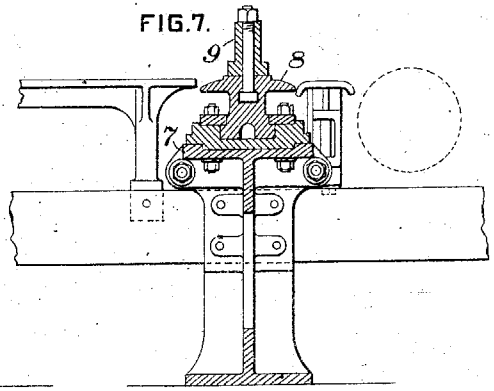
Figure 6:
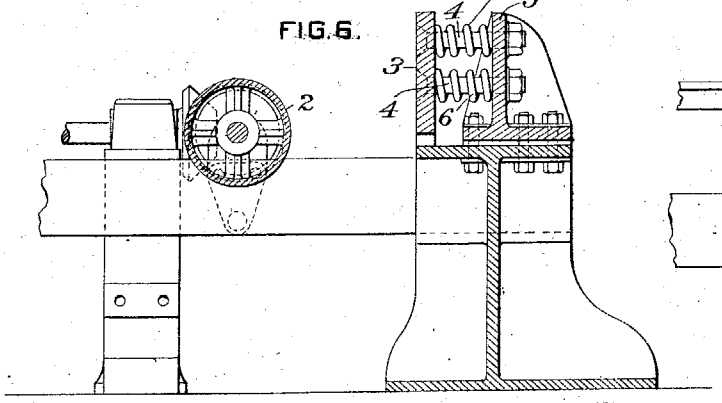
Figure 2:
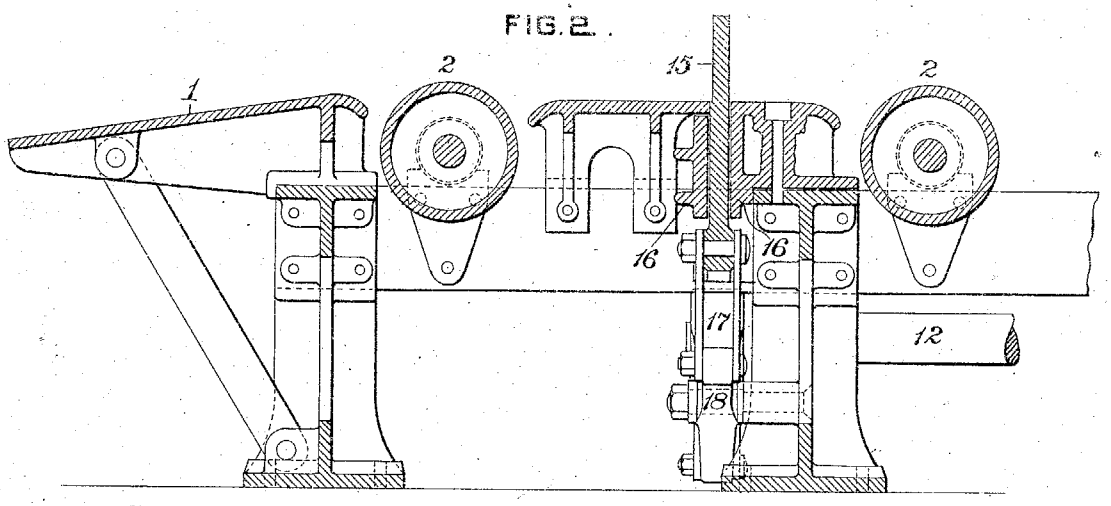
Figure 3:
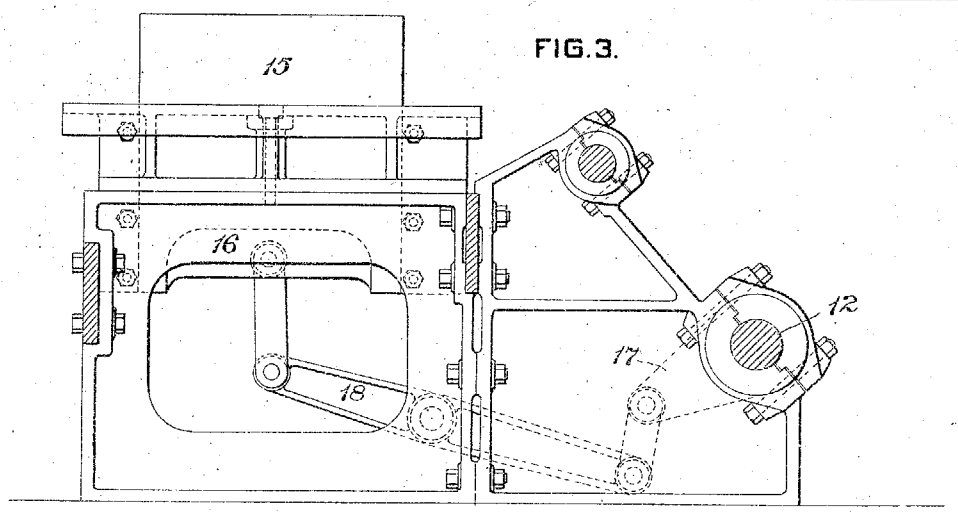

In the accompanying drawings, forming a part of this specification, Figure 1 is a plan view showing the relative arrangement of feed-tables, &c., in my improved plant. Fig. 2 is a sectional elevation, on an enlarged scale, of the front end of the storage-table. Fig. 3 is a transverse section, the plane of section being indicated by the line *x x*, Fig. 1. Fig. 4 is a top plan view, on an enlarged scale, of the mechanism for transferring the billet-stock from the storage to the shear feed table. Fig. 5 is a transverse section, the plane of section being indicated by the line *y y*, Fig. 4. Fig. 6 is a sectional elevation of the rear end of the storage-table, showing the back-stop. Fig. 7 is a transverse section on the plane indicated by the line *z z*, Fig. 4. Fig. 8 is a top plan view showing a modification in the relative arrangement of the storage and shear tables; and Fig. 9 is a sectional elevation of the same, the plane of section being indicated by the line *w w*, Fig. 8.

In modern rolling-mill practice the reduction of ingots to billet-stock can be effected more rapidly than the shearing of such stock into billets. This difficulty has been overcome by so constructing the shear mechanism that two or more pieces of billet-stock can be sheared at the same time, but difficulty has been encountered in taking care of pieces of stock which are being rolled while other pieces are being sheared and in transferring the second lot of stock to the shear-table.

In order to overcome the difficulties now encountered in the production of billets, &c., I arrange what I term, for convenience, a "storage-table" A in line with the delivery-table of a rolling-mill, so that billet-stock may be delivered directly to the storage-table without handling. This storage-table consists of an apron 1 for guiding the billet-stock, a series or positively-driven rollers 2, and a stop device D at the rear end of the storage-table. The stop device consists of a thick plate 3, attached to bars 4, which are movably mounted in a backing plate or abutment 5. Springs 6 are interposed between the plate 3 and the abutment 5, thereby forming a yielding stop for the billet-stock, as shown in Figs. 1 and 6.

The mechanism employed for shifting the billet-stock from the storage-table A to the shear-table B consists of a series of supporting-frames 7, arranged intermediate of and parallel with the rollers 2 of the table, and a like series of slides 8, mounted on said supporting-frames. The slides 8 are slotted longitudinally to permit of the adjustment of the blocks 9, which are mounted on the slides, as shown in Figs. 4 and 5. The slides are connected by links 10 to the ends of arms 11, keyed to the shaft 12, which is mounted in suitable bearings parallel with the table A. The shaft 12 is oscillated to shift the slides by a fluid-pressure cylinder 13, whose piston is connected to arms 14 on the shaft, as shown in Fig. 1. The slots in the slides 8 are made of such a length that the blocks 9 can be shifted from a position a little to one side of the pass at one end of the reducing-rolls to a corresponding position with relation to a pass at the opposite ends of the rolls, thereby reducing the length of stroke of the slides when passes at the ends of the reducing-rolls nearest the shear-tables are being employed.

In order to prevent billet-stock from being fed onto the storage-table while the transfer mechanism is being operated to shift stock onto the shear-table, in which case the billet coming onto the storage-table would pass behind the blocks 9, a gate 15 is arranged transverse of the storage-table near its front end, as shown in Figs. 1, 2, and 3. This gate is arranged between guides 16 and is shifted vertically by an arm 17 on the shaft, said arm being connected by a link to one end of a lever 18, the opposite end of which is connected to the lower end of the gate. This gate-operating mechanism is arranged so as to raise the gate into the line of movement of any billet-stock from the feed-table of the rolling-mill simultaneous with the shifting of the transfer mechanism toward the shear-table and thereby preventing any movement of billet-stock onto the storage-table while stock is being shifted from the storage-table to the shear-table.

The shear-table consists of a series of positively-driven rollers 19, so arranged that one end of at least a portion of the rollers will project a short distance between the rollers 2 of the storage-table, so that the billet-stock will be supported in part by the rollers 19 before being shifted entirely from the rollers 2, as shown in Fig. 1. As the rollers 2 and 19 are so mounted that the upper portions of their peripheries are in or approximately in the same horizontal plane, it is preferred that the ends of the rollers 19 projecting between the rollers 2 should be beveled, so that they will not offer any obstruction to the lateral movement of the billet-stock. The shear mechanism G, which is arranged at the end of the table B, may be of any suitable construction.

As shown in Figs. 8 and 9, the shear-table may be arranged in line with the storage-table, in which case a movable stop E is substituted for the stationary stop D. This movable stop is constructed as regards the upper portion the same as the stop D, and consists of a plate 3, supported by bars 4, mounted in a backing plate or abutment 5, which is secured to the upper end of the piston of the fluid-pressure cylinder 20.

In order to prevent the billet-stock from being shifted too far across the shear-table, a rail 21 is arranged along the outer ends of the rolls 19, as shown in Fig. 1, said rail being strongly supported by brackets 22, so as to resist the impact of the billet-stock when shifted. In the construction shown in Figs. 8 and 9 two guide-rails 23 and 24 are arranged along the ends of the rollers 19 of the shear-table, the ends of said rails adjacent to the storage-table being bent outwardly, so as to properly guide the billet-stock onto the shear-table.

In operating my improved plant the blocks 9 are first adjusted on their slides 8 a little to one side of the line of movement of billet-stock onto the storage-table A, such line of movement being dependent upon the position of the finishing-pass in the reducing-rolls. As soon as a piece of stock has been shifted onto the storage-table and its onward movement checked by the stop at the end of the storage-table fluid-pressure is admitted to the cylinder 13 and the slide 8 shifted toward but not onto the shear-table B if more than one piece of stock is to be cut up at the same time. Simultaneous with this movement of the slides the gate 15 is raised, as hereinbefore stated, to prevent the movement of another piece of stock onto the storage-table until the return of the slides to normal position. Simultaneous with the return of the slides the gate is lowered, thereby permitting the movement of a second piece of stock onto the storage-table. This second piece is then shifted so as to be out of the way of succeeding pieces. This operation is continued until the desired number of pieces has been arranged on the storage-table. This batch is then shifted by a longer movement of the slides onto the shear-table B, whereby the batch is fed to the shears. While the first batch is being cut up, a second batch is being collected on the storage-table. As soon as the first batch has been cut up or sufficiently so as to permit a second batch being shifted onto the shear-tables the second batch is so shifted by the slides.

It is characteristic of my improvement that when the rollers of the rolling-mill delivery-table and the storage and shear tables are continuously rotated the onward movements of the billet-stock are checked when necessary by the interposition of a suitable stop, and during such arrest of movement the rollers simply rub against the under side of the article, so that the rolling of the ingots to billet-stock can proceed uninterruptedly without regard to the operation of the shearing operation, all surplus stock being stored upon the table A until the shear mechanism is clear. If the capacity of the shear mechanism is equal to that of the rolling-mill the table A is used to transfer the billet-stock from the rolling-mill table to the shear-table.

In operating the construction in Figs. 8 and 9 each piece of billet-stock is shifted laterally on the storage-table out of the way of the next succeeding piece; but when the stock is to be transferred to the shear-table the stop E is lowered, thereby permitting the stock to be moved longitudinally onto the shear-table by the rollers of the storage and shear tables.

While it is possible and sometimes preferable to operate the rollers of the storage and shear tables continuously, they may be so connected to the driving mechanism that their rotation can be stopped when not required—as, for example, the rollers of the storage-table can be stopped after one piece has been received until another piece is ready for delivery thereto—and the rollers of both tables can be stopped during the transfer of stock from the storage to the shear table.

I claim herein as my invention—

1. The combination of a shear-table and means for assembling and conveying to the shear-table a group of metal pieces, substantially as set forth.

2. The combination of a feed-table, a shear-table and mechanism for assembling a group of metal pieces and shifting such group laterally onto the shear-table, substantially as set forth.

3. The combination of a feed-table having positively-driven feed-rollers and arranged to receive billet-stock, &c., from a rolling-mill, a shear mechanism, a table having positively-driven rollers for feeding billet-stock to the shear mechanism, said tables being arranged alongside of each other, the rollers of one table projecting a short distance between the rollers of the other table, and mechanism for shifting the billet-stock, &c., to the shear-table, substantially as set forth.

4. The combination of a table provided with feed-rollers for moving billet-stock along said table, mechanism for laterally shifting the billet-stock on the feed-table, a gate for preventing the movement of stock onto the feed-table, and means connecting the same for simultaneously operating the shifting mechanism and the gate, substantially as set forth.

5. The combination of a table provided with driven rollers for moving billet-stock along the table, a stop for arresting the longitudinal movement of the stock, and mechanism having a variable movement for shifting the billet-stock laterally on the rollers, whereby a number of pieces of billet-stock may be stored upon the table, substantially as set forth.

6. The combination of a table provided with driven rollers for moving billet-stock along the table, a feed-table provided with positively-driven rollers for feeding billet-stock, &c., to a shear mechanism, a stop for preventing the longitudinal movement of the stock on the storage-table, and mechanism having a variable movement for shifting the billet-stock laterally on the storage-rollers, whereby a number of pieces of stock may be held upon the storage-table and then transferred to the shear feed-table, substantially as set forth.

In testimony whereof I have hereunto set my hand.

SIGMUND V. HUBER.

Witnesses:
LEO GUTHMAN,
WM. JOHNSON.